United States Patent [19]
Kee

[11] Patent Number: 5,183,679
[45] Date of Patent: Feb. 2, 1993

[54] METHOD FOR PROCESSING FROZEN FOOD USING SUPER HIGH PRESSURE WATER JETS

[75] Inventor: Howard L. Kee, Palermo, Calif.

[73] Assignee: Kee Equipment & Engineering, Inc., Palermo, Calif.

[21] Appl. No.: 733,666

[22] Filed: Jul. 22, 1991

[51] Int. Cl.$^5$ .............................................. A23L 1/00
[52] U.S. Cl. .................................... 426/479; 426/524
[58] Field of Search ............... 426/518, 643, 479, 524; 83/177; 134/22.12; 99/516

[56] References Cited

U.S. PATENT DOCUMENTS 4,294,861 10/1981 Ikufu et al. .......................... 426/489
4,620,466 11/1986 Jumel et al. ............................ 83/701
5,031,496 7/1991 Lobash et al. ......................... 83/177

Primary Examiner—George Yeung
Attorney, Agent, or Firm—Limbach & Limbach

[57] ABSTRACT

A method and apparatus for processing frozen food. The apparatus of the invention applies super high pressure water jets (at pressure on the order of 2000 p.s.i. or greater) to frozen food at a grazing incidence angle, to apply a shearing force to the food. In one embodiment, the apparatus includes two sets of water jets. The first set simultaneously thaws a surface portion of a frozen food item and cleans the item. The second set further thaws the item and shears off a surface portion thereof (such as the scales of a frozen fish). To clean and scale frozen fish, the jets in the first set are typically oriented at an incidence angle in the range 45–60 degrees, and the jets in the second set are typically oriented at an incidence angle in the range 20–29 degrees.

6 Claims, 3 Drawing Sheets

METHOD FOR PROCESSING FROZEN FOOD USING SUPER HIGH PRESSURE WATER JETS

FIELD OF THE INVENTION

The invention is a method and apparatus for processing frozen food, such as frozen fish. More particularly, the invention is a method and apparatus for processing frozen food using super high pressure water jets oriented so as to apply a shearing force to the frozen food.

BACKGROUND OF THE INVENTION

Conventional fish scaling and cleaning systems have used metal knife blades, such as serrated knives, for scaling fish. However, such systems cannot effectively process frozen fish. The fish must first be thawed to enable the knives to function effectively.

One type of conventional washing apparatus uses water jets to wash fruit, vegetables, or other items. The water is supplied to the jets at pressures typically within the range 250–2000 p.s.i. (i.e., at pressures much less than "super" high pressure). In such conventional washing systems, the water jets are typically oriented substantially perpendicularly to the surface to be washed, to exert normal force (rather than shearing force) on the surface.

SUMMARY OF THE INVENTION

The apparatus of the invention applies super high pressure water (having pressure on the order of 2000 p.s.i. or greater) jets to frozen food at a grazing incidence angle. The water jets apply a shearing force to the frozen food, and are capable of simultaneously thawing and cleaning the frozen food (or simultaneously thawing and shearing off a surface portion of the food). When the apparatus is used to process frozen fish, the water jets can simultaneously thaw an outer portion of the fish, and remove scales or skin (or both scales and skin) from the fish.

The inventive water jet apparatus can process frozen fish much more rapidly than can conventional systems of the type which employ metal knives. The inventive apparatus can achieve processing rates in the range from 1000 to 2000 pounds of frozen fish per hour, and can flush away waste material at the same time it scales the fish.

In one embodiment, the inventive apparatus includes two sets of water jets. The first set thaws a surface portion of a frozen food item, and at the same time cleans the item. The second set further thaws the food item and while simultaneously removing its surface portion (by shearing off the surface portion). When processing frozen fish, the second set of water jets can efficiently remove the scales from the fish. In this application, the jets in the first set are typically oriented at an incidence angle in the range 45–60 degrees (where an incidence angle of 90 degrees represents normal incidence) to clean and partially thaw the frozen fish. The jets in the second set are typically oriented at an incidence angle in the range 20–29 degrees, to further thaw and scale the fish.

DETAILED DESCRIPTION OF THE PREFERRED EMBODIMENTS

A preferred embodiment of the inventive apparatus will be described with reference to FIGS. 1, 2, and 3.

Figure 1:
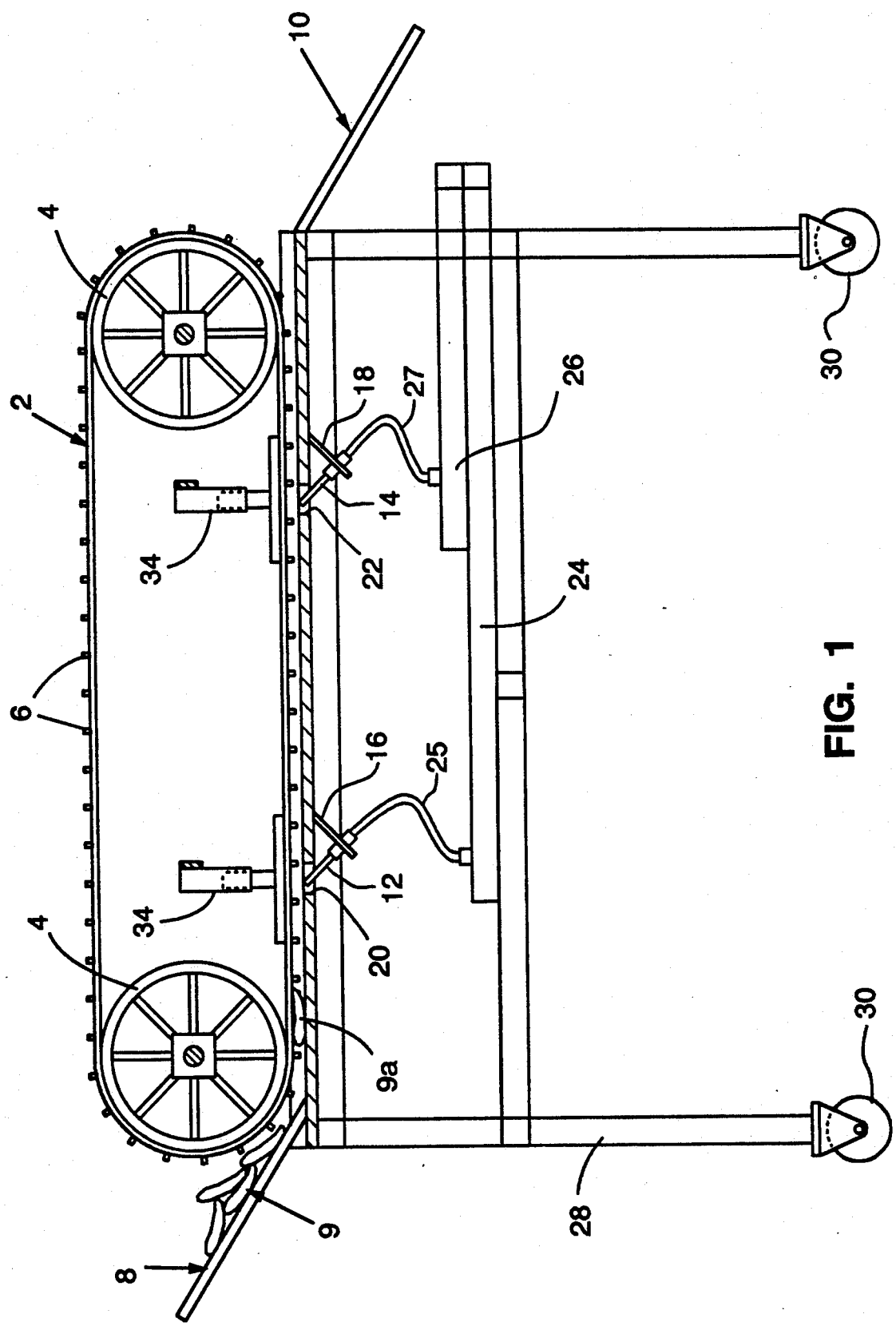
FIG. 1 is a side cross-sectional view of a preferred embodiment of the inventive apparatus.

As shown in FIG. 1, a plurality of outward-pointing spikes 6 protrude from conveyor belt 2. Conveyor belt 2 is looped around, and driven by, a pair of sprockets 4. Frozen food items 9 to be processed are loaded into infeed bin 8. As belt 2 translates past the bottom of bin 8, individual ones of the food items become impaled on spikes 6. Frozen food item 9a (shown in FIG. 1) is so impaled on spikes 6. Belt 2 translates each individual impaled food item horizontally from bin 8, past nozzle arrays 12 and 14, to discharge chute 10.

Throughout the specification, including in the claims, the phrase "nozzle array" is used to denote a set of one or more nozzles. Each of the nozzles can include one or more water outlets, so that each nozzle can emit one or more water jets.

Belt 2 and sprockets 4 are preferably made of a durable plastic. In one embodiment, belt 2 is thirty-two inches wide, and a hydraulic drive means is employed to drive sprockets 4 with variable speed.

One or more pressurized water jets emerge from each nozzle in each of arrays 12 and 14. The water jets from array 12 flow through opening 20 in frame 28 and successively strike a sequence of food items, as spikes 6 translate the food items past array 12. Similarly, each water jet from array 14 flows through opening 22 in frame 28 and successively strikes a sequence of food items, as spikes 6 translate the food items past array 14.

A spring tension assembly 34 is positioned opposite each of arrays 12 and 14. Each assembly 34 exerts a downward spring force on belt 2 to counteract the upward force exerted on the belt by water jets emerging from the nozzle array opposite the assembly 34.

Low pressure manifold 24 supplies pressurized water through hose set 25 to the nozzles of array 12. High pressure manifold 26 supplies pressurized water through hose set 27 to the nozzles of array 14. Water is supplied to nozzle array 14 at "super" high pressure (pressure on the order of 2000 p.s.i., or greater). Water can be supplied to nozzle 12 at such a super high pressure, or a lower pressure (such as 1000 p.s.i.). The water pressure is controlled according to the particular intended application (i.e., removing a desired combination of the skin, scales, fat, veins, and the like, of frozen whole fish or filets), and the size of the nozzles in arrays 12 and 14.

Throughout the specification, including in the claims, the term "fish" is employed in a broad sense to denote any fish product, including a whole fish or a fish filet.

Throughout the specification, including in the claims, the expression "grazing incidence angle" is employed to denote an incidence angle substantially less than 90 degrees (where an incidence angle of 90 degrees represents normal incidence). Thus, if a frozen food item has a generally flat surface (such as the downward-facing flat surface of frozen food item 9a in FIG. 1), a water jet incident at that surface in a direction normal to the surface has an incidence angle of 90 degrees (a "normal" incidence angle). In contrast, a water jet that strikes the surface at an incidence angle in the range 20–29 degrees (or less) is considered to have a "grazing" incidence angle.

When the FIG. 1 apparatus is employed to process frozen fish, water jets from array 12 simultaneously thaw and clean a surface portion of each frozen fish that translates past them. Then, water jets from array 14 further thaw the frozen fish and shear off a surface portion thereof (i.e., the scales of the fish, or both the scales and skin of the fish). Because the action of the jets thaws the scales of each fish, super high pressure jets from array 14 can efficiently remove the scales from the fish, provided that the jets are oriented at a grazing incidence angle with respect to a surface of the fish to apply a shearing force to the fish.

To clean and scale frozen fish, the jets in the first set are typically oriented at an incidence angle in the range 45-60 degrees (to clean and partially thaw the frozen fish), and the jets in the second set are typically oriented at an incidence angle in the range 20-29 degrees (to further thaw and scale the fish).

Nozzle array 12 is adjustably mounted to frame 28 by adjustable mounting means 16, and nozzle array 14 is adjustably mounted to frame 28 by adjustable mounting means 18. The incidence angle of the jets from arrays 12 and 14 can conveniently be controlled by adjusting means 16 and 18.

Frame 28 is preferably made of 304 stainless steel. Also preferably, frame 28 rests on swivel castors 30 so that the apparatus is portable.

Figure 2:
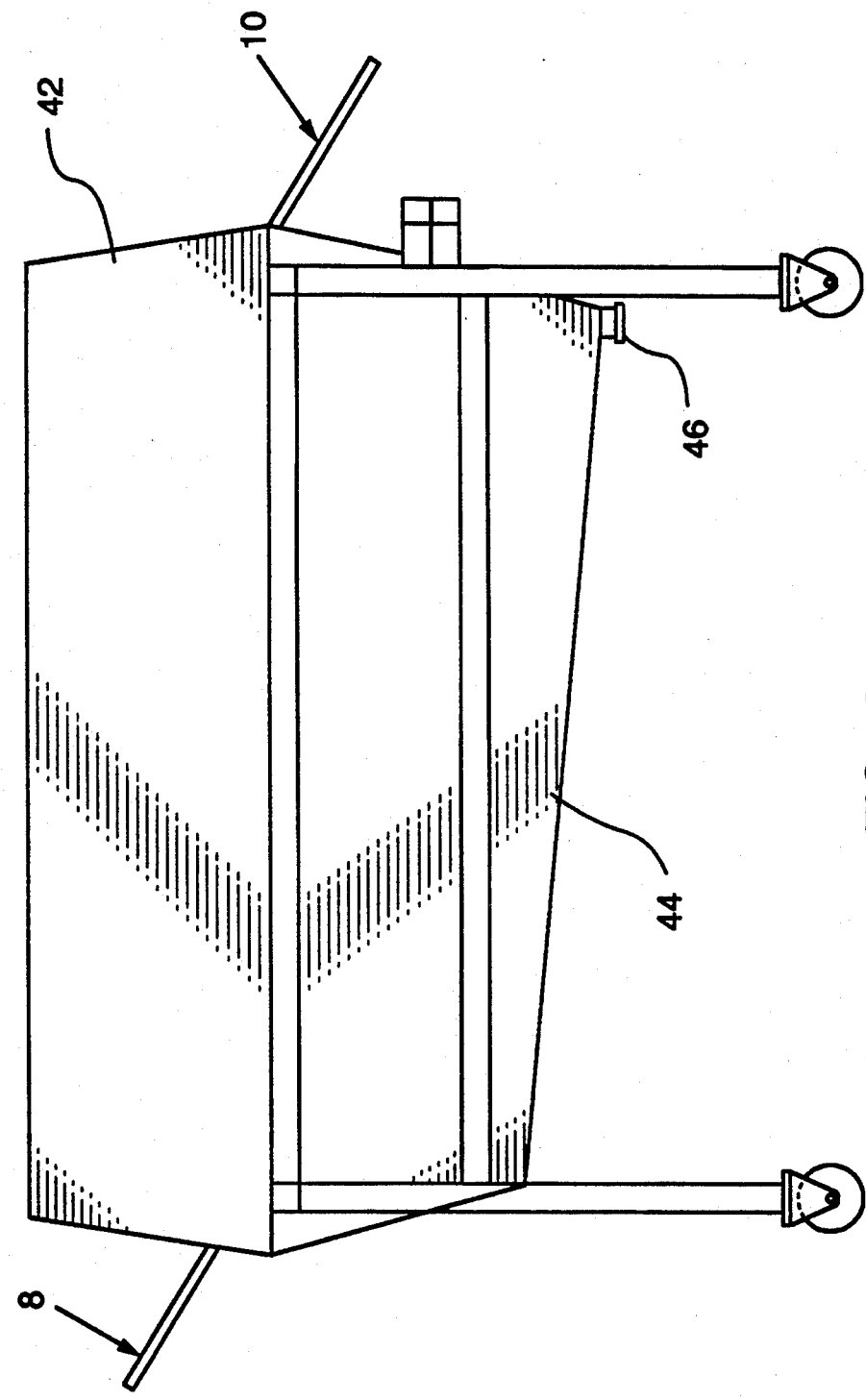
FIG. 2 is a side view of the apparatus of FIG. 1, enclosed by a stainless steel housing.

As shown in FIG. 2, hood 42 (preferably made of stainless steel) fits over the conveyor belt assembly of the apparatus, to prevent spraying water and food fragments from escaping the processing area. Tub 44 attached to frame 28 also confines the process water and the food fragments, and directs them to drain 46. Hood 42 and tub 44 are preferably made of stainless steel.

Figure 3:
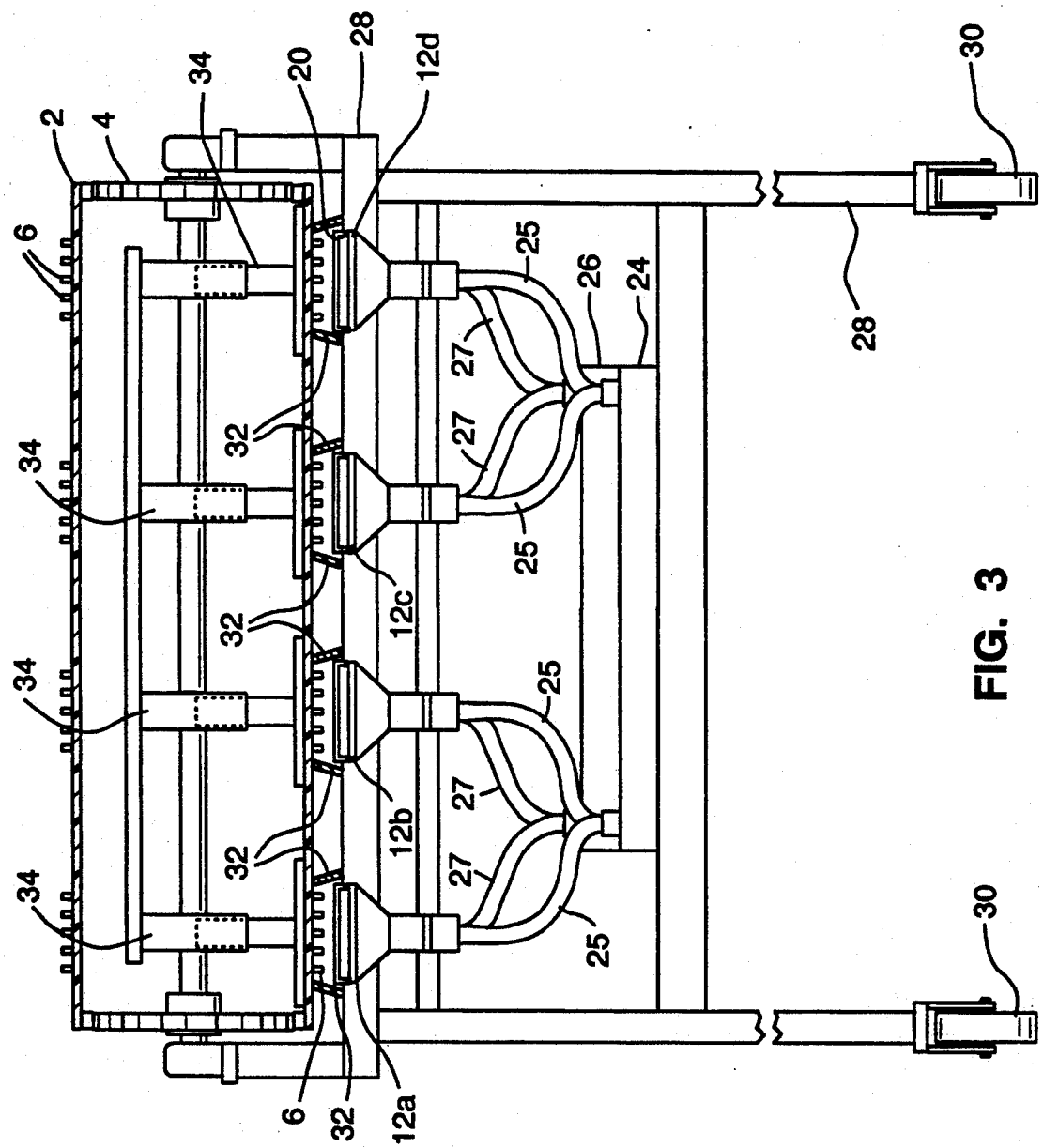
FIG. 3 is an end view of the input end of the apparatus shown in FIG. 1.

As shown in FIG. 3, nozzle array 12 includes four nozzles 12a, 12b, 12c, and 12d, each of which directs several water jets through opening 20 in frame 28 to spikes 6 of belt 2. Angled belt runners 32 (which extend through opening 20) support belt 2 and prevent water from nozzles 12a, 12b, 12c, and 12d from flowing away from spikes 6.

Spikes 6 are grouped in four clusters. Each cluster is oriented relative to nozzle array 12 so as to position a stream of food items opposite one of nozzles 12a, 12b, 12c, and 12d. Thus, the apparatus can simultaneously process four parallel streams of frozen food items using water jets from array 12.

There are also four nozzles in nozzle array 14, for processing the same four parallel streams of food items that are processed by array 12. The nozzles that comprise array 14 are not visible in FIG. 3, since each of them is positioned directly behind one of nozzles 12a, 12b, 12c, and 12d.

Each of the four hoses comprising hose set 25 supplies pressurized water from manifold 24 to one of nozzles 12a, 12b, 12c, and 12d. Similarly, each of the four hoses comprising hose set 27 supplies pressurized water from high pressure manifold 26 to one of the nozzles (not shown in FIG. 3) of nozzle array 14.

In accordance with the inventive method, one or more frozen food items are conveyed past a nozzle array. Each nozzle in the array directs one or more super high pressure water jets, with grazing incidence, at each frozen food item.

The foregoing is merely illustrative and explanatory of the inventive method and apparatus. Various changes in the component sizes and shapes, and other details of the embodiments described herein may be within the scope of the appended claims.

What is claimed is:

1. A method for processing a frozen food item, including the steps of:
    conveying the frozen food item past a nozzle array; and
    directing one or more super high pressure water jets at a pressure of at least 2000 p.s.i. from the nozzle array with grazing incidence at the frozen food item, to apply a shearing force to the frozen food item as the frozen food item passes the nozzle array.

2. The method of claim 1, wherein each of the super high pressure water jets strikes the frozen food item with an incidence angle in the range from 20 to 29 degrees.

3. The method of claim 1, wherein the nozzle array includes a first nozzle and a second nozzle, and including the steps of:
    (a) conveying the frozen food item past the first nozzle and simultaneously conveying a second frozen food item past the second nozzle;
    (b) directing one or more super high pressure water jets at a pressure of at least 2000 p.s.i. from the first nozzle with grazing incidence at the frozen food item, as the frozen food item passes the first nozzle; and
    (c) while performing step (b), directing one or more super high pressure water jets at a pressure of at least 2000 p.s.i. from the second nozzle with grazing incidence at the second frozen food item, as the second frozen food item passes the second nozzle.

4. The method of claim 1, wherein the frozen food item is a frozen fish having scales, and wherein the super high pressure water jets exert a sufficiently strong shearing force on the frozen fish to remove the scales from the fish.

5. The method of claim 1, wherein the nozzle array is positioned at a first station along the processing path, and also including the steps of:
    before directing the super high pressure water jets at the frozen food item from the nozzle array, conveying the frozen food item past a second nozzle array; and
    while the frozen food item passes the second nozzle array, directing one or more water jets at a pressure of at least 2000 p.s.i. from the second nozzle array with grazing incidence at the frozen food item.

6. The method of claim 5, wherein the frozen food item is a frozen fish, wherein the water jets from the second nozzle array clean the fish, and wherein the water jets from the nozzle array remove scales from the fish.

* * * * *